United States Patent
Chen et al.

(10) Patent No.: US 7,291,952 B2
(45) Date of Patent: Nov. 6, 2007

(54) LOW-ABRASION ROTATING STRUCTURE

(75) Inventors: Lee-Long Chen, Taoyuan Hsien (TW); Chien-Hsiung Huang, Taoyuan Hsien (TW); Wen-Shi Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 0 days.

(21) Appl. No.: 11/033,621

(22) Filed: Jan. 13, 2005

(65) Prior Publication Data
US 2006/0006752 A1    Jan. 12, 2006

(30) Foreign Application Priority Data
Jul. 9, 2004    (TW) ............................... 93120592 A

(51) Int. Cl.
*H02K 5/00*    (2006.01)

(52) U.S. Cl. .......................................... 310/91; 310/90
(58) Field of Classification Search ................ 310/91, 310/90, 90.5
See application file for complete search history.

(56) References Cited

U.S. PATENT DOCUMENTS

| 4,207,485 | A  | * | 6/1980  | Silver ........................ 310/104 |
| 5,675,203 | A  | * | 10/1997 | Schulze et al. ............. 310/113 |
| 6,380,653 | B1 | * | 4/2002  | Seguchi ...................... 310/112 |
| 6,454,548 | B2 | * | 9/2002  | Falk et al. .................. 417/417 |
| 6,762,518 | B1 | * | 7/2004  | Yamaguchi et al. ...... 310/67 R |
| 6,891,289 | B2 | * | 5/2005  | Barrho et al. ............. 310/49 R |

* cited by examiner

*Primary Examiner*—Dang Le
*Assistant Examiner*—Nguyen Hanh
(74) *Attorney, Agent, or Firm*—Birch, Stewart, Kolasch & Birch, LLP

(57) ABSTRACT

A low-abrasion rotating structure includes a stator set, a rotor set, and a rotating shaft. A stator hole is defined at a center of the stator set. A rotor hole is defined at a center of the rotor set. The rotating shaft is disposed in both the stator hole and the rotor hole to connect the stator set and the rotor set, and is rotatable in respect to the stator set and the rotor set.

14 Claims, 4 Drawing Sheets

LOW-ABRASION ROTATING STRUCTURE

BACKGROUND

The invention relates to a rotating structure, and in particular, to a low-abrasion rotating structure.

A motor can be applied to a heat-dissipation fan in a computer or a compressor in an air conditioner. During rotation, the quality of the motor depends on a rotating structure thereof. Efficient rotating structure can prolong the life of the motor and decrease the noise of the motor.

FIG. 1 shows a conventional rotating structure 1 comprising a bearing support 11, a bearing 12, a rotating shaft 13, and a fastener 14. The bearing support 11 comprises a round hole or concave portion. The bearing 12 comprises a hole 121, and is disposed in the round hole or the concave portion of the bearing support 11 in a close fit manner. The rotating shaft 13 is rotatably disposed in the hole 121. The fastener 14 is fastened at one end of the rotating shaft 13 to prevent the rotating shaft 13 from separating from the bearing 12. The bearing 12 may be oil-bearing material to provide better lubricity or ceramic material to provide better abrasion resistance. The oil-bearing material may be self-lubricating material sintered by copper-based, iron-based, or copper iron-based powders that have been dipped in oil. The ceramic material comprises AlO, ZrO, or SiN.

When the rotating structure 1 rotates at high speeds, both ends, contacting the rotating shaft 13, of the bearing 12 are easily worn. If the bearing 12 is oil-bearing material with better lubricity, abrasion resistance is lowered so that the powder is easily mixed with the lubricant. Thus, the lubricant deteriorates, shortening the life of the bearing. On the contrary, if the bearing 12 is ceramic material with better abrasion resistance, its lubricity is lowered, thus increasing noise produced thereby.

Additionally, in the above rotating structure, large amounts of lubricant cannot be maintained since a gap between the bearing 12 and the rotating shaft 13 is extremely small. That is, only small amounts of lubricant can be maintained in a shallow groove on the inner wall of the hole 121, with excess lubricant leaking out.

Thus, it is desirable for a rotating structure to improve abrasive resistance without increasing noise.

SUMMARY

In view of this, an embodiment of the invention provides a low-abrasion rotating structure that can improve the abrasive resistance of the bearing to prolong the life of the rotating structure.

The above embodiment of the invention provides a low-abrasion rotating structure that can reduce noise during rotation.

Furthermore, the above embodiment of the invention provides a low-abrasion rotating structure that can maintain large amounts of lubricant between a stator set and a rotor set to prevent the lubricant from leaking.

Accordingly, an embodiment of the invention provides a low-abrasion rotating structure comprising a stator set, a rotor set, and a rotating shaft. A stator hole is defined at a center of the stator set. A rotor hole is defined at a center of the rotor set. The rotating shaft is disposed in both the stator hole and the rotor hole to connect the stator set and the rotor set, and is rotatable in respect to each of the stator set and the rotor set. The low-abrasion rotating structure further comprises a spiral coil disposed between the rotor set and the stator set. A spiral direction of the spiral coil is the same as a rotating direction of the rotating shaft.

In the low-abrasion rotating structure of the embodiment of the invention, more than two rotatable elements are disposed between the stator set and the rotor set. Thus, the abrasion of the stator set and the rotor set due to the rotating shaft is largely reduced. Furthermore, since the relative speed of the rotating shaft with respect to the stator set and the rotor set is reduced, the noise of the rotating structure is reduced during rotation. Additionally, since the spiral direction of the spiral coil is the same as the rotating direction of the rotating shaft, the lubricant flows into a concave portion of the stator set along the spiral direction of the spiral coil during rotation, thus preventing the lubricant from leakage.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the subsequent detailed description and the accompanying drawings, which are given by way of illustration only, and thus are not limitative of the present invention, and wherein.

DETAILED DESCRIPTION

Figure 2:
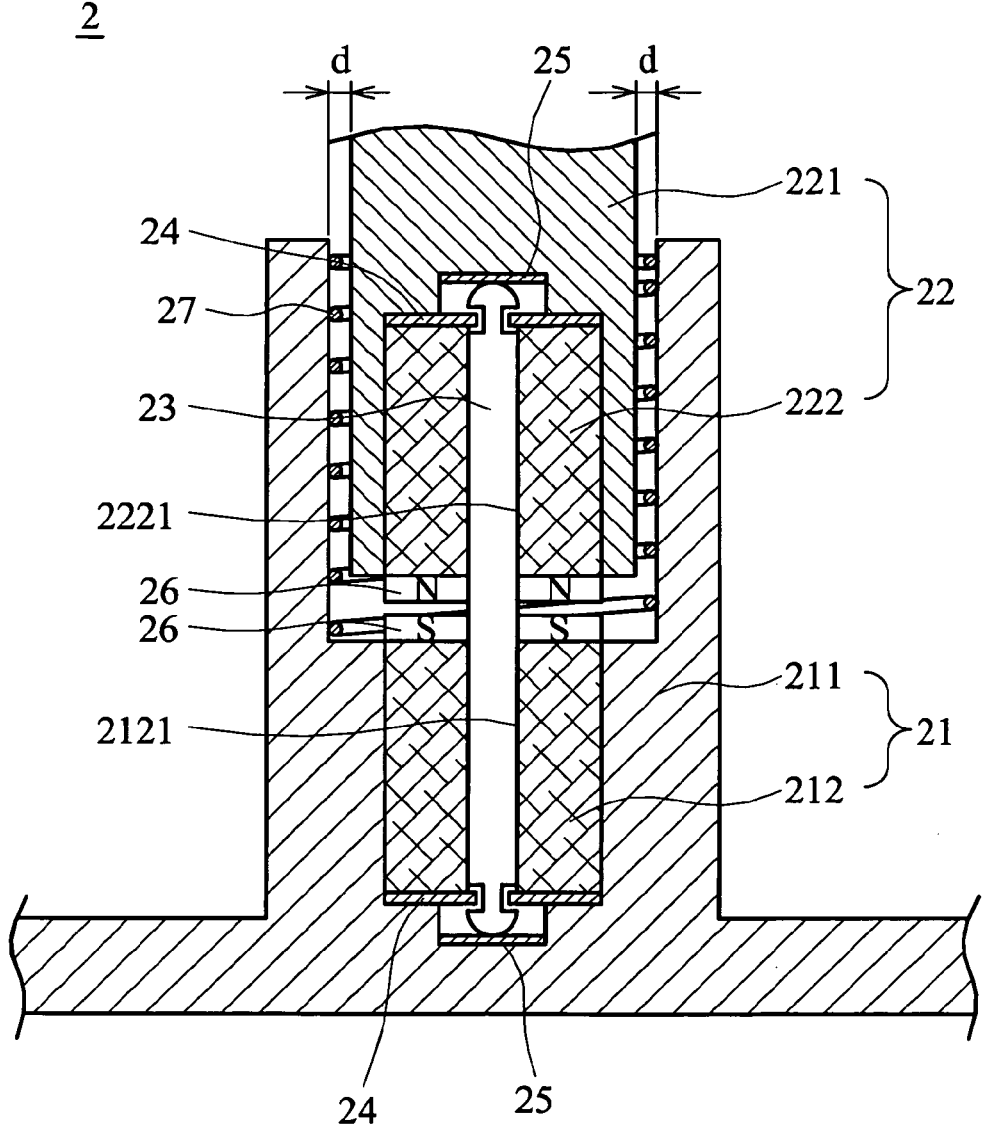
FIG. 2 is a schematic view of a low-abrasion rotating structure as disclosed in an embodiment of the invention.

FIG. 2 shows a low-abrasion rotating structure 2 as disclosed in an embodiment of the invention. The rotating structure 2 comprises a stator set 21, a rotor set 22, and a rotating shaft 23. The stator set 21 comprises a stator seat 211 and a stator sleeve 212. The stator seat 211 comprises a concave portion receiving the stator sleeve 212. The stator sleeve 212 is disposed in the concave portion of the stator seat 211 in a close fit manner. The stator sleeve 212 comprises a stator hole 2121 at its center. The rotor set 22 comprises a rotor seat 221 and a rotor sleeve 222. The rotor seat 221 comprises a concave portion receiving the rotor sleeve 222. The rotor sleeve 222 is disposed in the concave portion of the rotor seat 221 in a close fit manner. The rotor sleeve 222 comprises a rotor hole 2221 at its center. The rotating shaft 23 is disposed in both the stator hole 2121 and the rotor hole 2221 to connect the stator set 21 and the rotor set 22, and is rotatable relative to the stator set 21 and the rotor set 22. Thus, the rotor set 22 is rotatable relative to the stator set 21.

The low-abrasion rotating structure 2 further comprises two fasteners 24 at both ends of the rotating shaft 23 to prevent the rotating shaft 23 from separating from the rotor hole 2121 or the stator hole 2221. Each fastener 24 is fixed at the bottom of the concave portion of the stator seat 211 or the bottom of the concave portion of the rotor seat 221 to avoid vibration effect of the fasteners 24, thus enhancing stability of the rotating structure 2 during rotation. Additionally, each end of the rotating shaft 23 comprises a cumbered surface, reducing the area contacting the bottom of the concave portion of the stator seat 211 or the rotor seat 22, thus reducing abrasion between the rotating shaft 23 and the stator set 21 or the rotor set 22. Moreover, an anti-wearing plate 25 is disposed in the bottom of the concave portion of the rotor set 22 or the stator set 21 abutting the ends of the rotating shaft 23. Thus, abrasive resistance is enhanced, such that the vibration from the gap generated by the abrasion is reduced.

The low-abrasion rotating structure 2 further comprises a pair of ring-shaped magnetic members 26, facing each other, disposed at the rotor set 22 and the stator set 21 respectively. Note that each magnetic member 26 may be a permanent magnet. The magnetic pole of the magnetic member 26 disposed at the rotor set 22 and the corresponding magnetic pole of the magnetic member 26 disposed at the stator set 21 are opposite, as shown in FIG. 2. Since the magnetic members 26 attract each other due to opposite magnetic poles, the stator set 21 and the rotor set 22 approach each other due to the magnetic force of the magnetic members 26. Also, since both ends of the rotating shaft 23 abut the anti-wearing plates 25 in the stator seat 211 and the rotor seat 221 respectively, the gap between the stator set 21 and the rotor set 22 can be properly maintained to enable free rotation. Thus, abutment between the end of the rotating shaft 23 and the anti-wearing plate 25 is assured so as to enhance stability of the rotating structure during rotation. As a result, abrasion is concentrated on the anti-wearing plate 25 to prolong the life of the rotating shaft 23, the stator set 21, and the rotor set 22. Additionally, since the rotating shaft 23 is rotatable in respect to the stator set 21 and the rotor set 22, the relative speed of the rotating shaft 23 with respect to the stator set 21 or the rotor set 22 is reduced compared to the conventional rotating structure in the same situation. Thus, the abrasion between the rotating shaft 23 and the stator set 21 or the rotor set 22 is reduced so as to prolong the life thereof.

Figure 3:
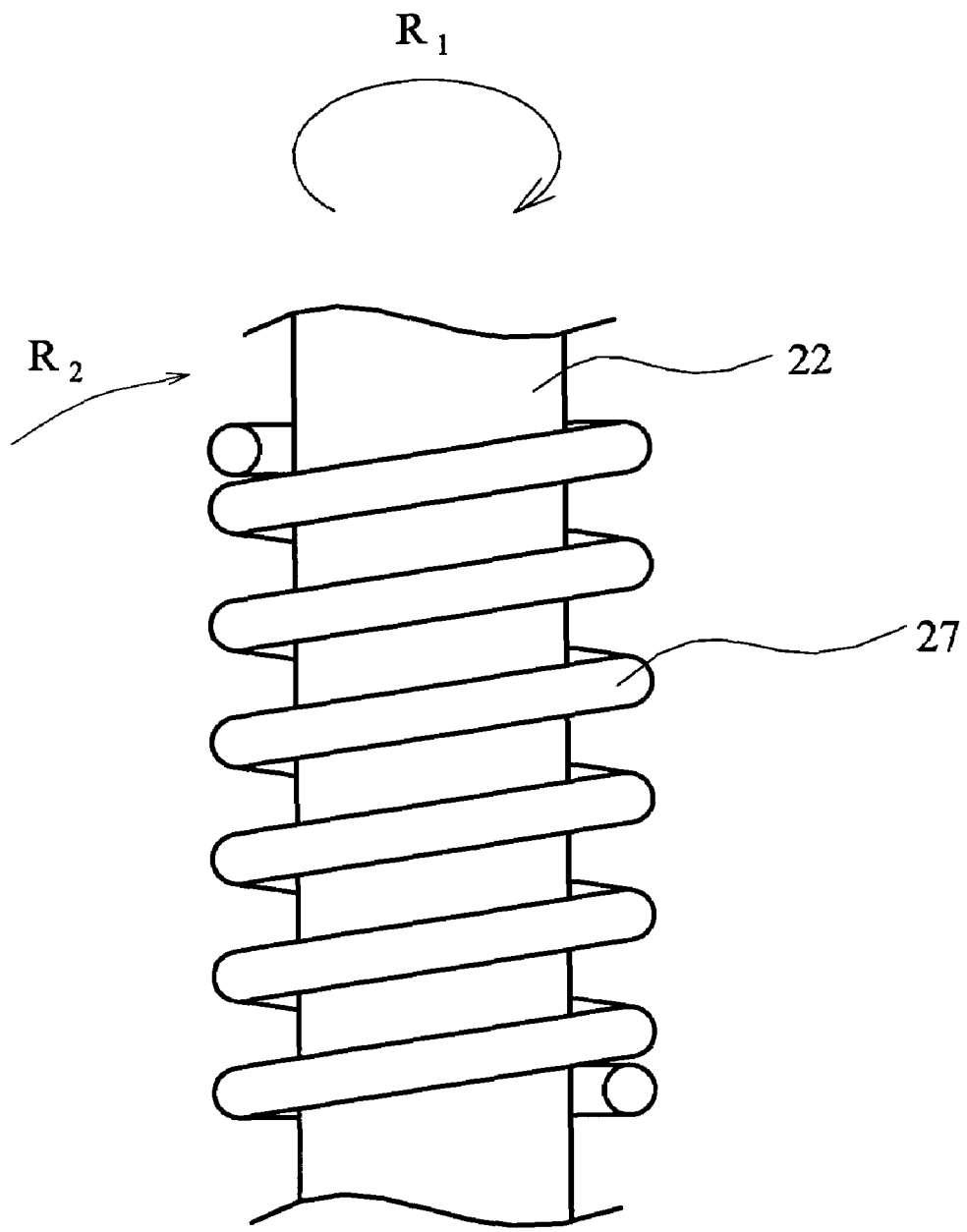
FIG. 3 is a schematic view of a rotor set and a spiral coil in FIG. 2.

As shown in FIG. 2, by the design of the rotating shaft 23 and the stator hole 2121 of the embodiment, the stability of the low-abrasion rotating structure 2 can be enhanced. Thus, a larger gap d can be maintained between the stator set 21 and the rotor set 22 so that increased amounts of lubricant can be accommodated in the gap d. Also, the low-abrasion rotating structure 2 further comprises a spiral coil 27 disposed in the gap d. That is, the spiral coil 27 is disposed between the stator set 21 and the rotor set 22. Referring to FIG. 3, a spiral direction $R_2$ of the spiral coil 27 is the same as a rotating direction $R_1$ of the rotor set 22.

Figure 4:
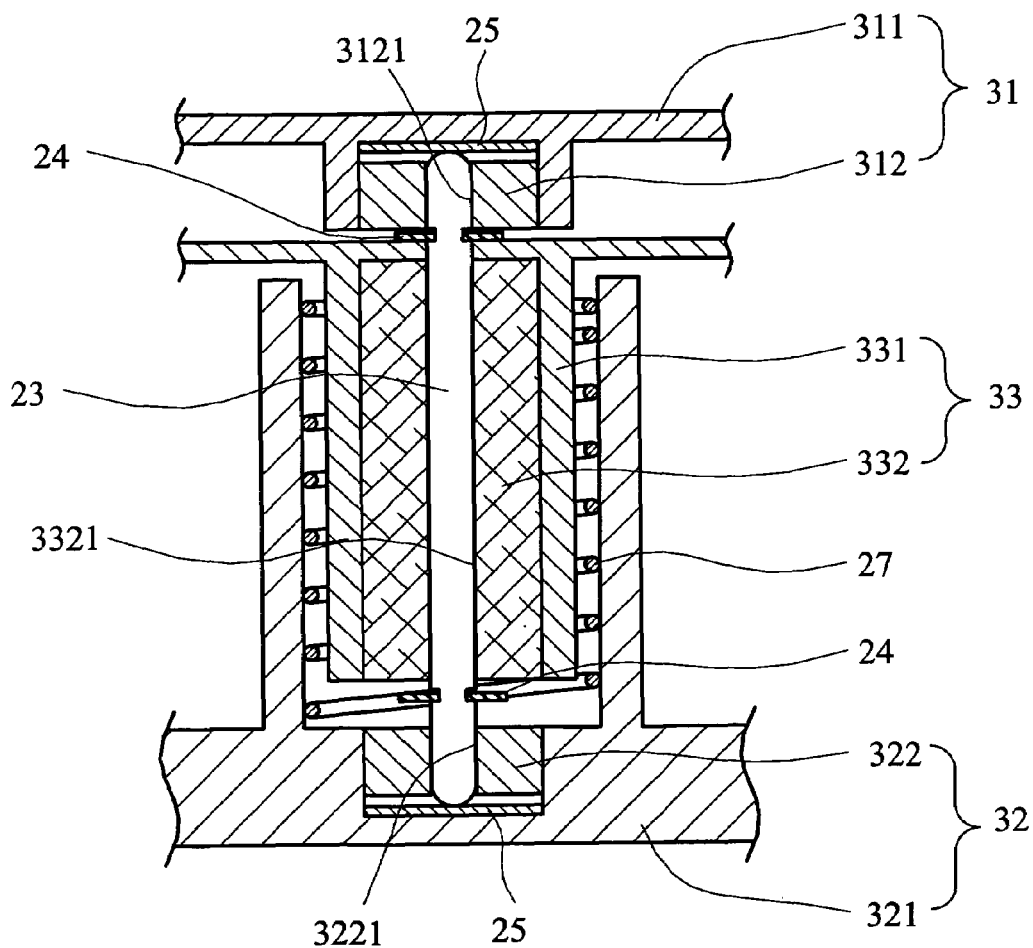
FIG. 4 is a schematic view of a low-abrasion rotating structure as disclosed in another embodiment of the invention.

FIG. 4 shows a low-abrasion rotating structure 3 as disclosed in another embodiment of the invention. The rotating structure 3 comprises a first stator assembly 31, a second stator assembly 32, a rotor set 33, and a rotating shaft 23. The first stator assembly 31 comprises a first stator seat 311 and a first stator sleeve 312. The first stator seat 311 comprises a concave portion receiving the first stator sleeve 312. The first stator sleeve 312 is disposed in the concave portion of the first stator seat 311 in a close fit manner. The second stator assembly 32 comprises a second stator seat 321 and a second stator sleeve 322. The second stator seat 321 comprises a concave portion receiving the second stator sleeve 322. The second stator sleeve 322 is disposed in the concave portion of the second stator seat 321 in a close fit manner. The first stator sleeve 312 and the second stator sleeve 322 each comprises a stator hole 3121 and 3221 at their respect center. Note that the first stator assembly 31 and the second stator assembly 32 here constitute a stator set of this embodiment. The rotor set 33 comprises a rotor seat 331 and a rotor sleeve 332. The rotor seat 331 comprises a concave portion receiving the rotor sleeve 332. The rotor sleeve 332 is disposed in the concave portion of the rotor seat 331 in a close fit manner. The rotor sleeve 332 comprises a rotor hole 3321 at its center. The rotating shaft 23 is disposed in both the stator holes 3121, 3221 and the rotor hole 3321, such that the rotor set 33 is connected between the first stator assembly 31 and the second stator assembly 32. Thus, the rotor set 33 is rotatable in respect to the first stator assembly 31 and the second stator assembly 32. Additionally, function of the fasteners 24, the anti-wearing plates 25, and the spiral coil 27 in FIG. 4 are the same as those in FIG. 2, and their description is thus omitted.

Note that the stator sleeve 212, the first stator sleeve 312, the second stator sleeve 322, and the rotor sleeves 222 and 332 may be made of oil-bearing material or ceramic material based on requirements. The oil-bearing material may be sintered by copper-based, iron-based, or copper iron-based powders that have been dipped in the oil. The ceramic material comprises AlO, ZrO, or SiN.

In the low-abrasion rotating structure of the embodiment of the invention, more than two rotatable elements are disposed between the stator set and the rotor set. Thus, abrasion of the stator sleeve and the rotor sleeve from the rotating shaft is largely reduced. Referring to FIG. 2, the rotating shaft 23 is rotatable relative to the stator set 21 and the rotor set 22, rather than having a close fit. Thus, the relationship between the rotating shaft 23, the stator set 21, and the rotor set 22 can assume one of three conditions as follows. If frictional force between the stator set 21 and the rotating shaft 23 is equal to that between the rotor set 22 and the rotating shaft 23, the relative speed of the rotating shaft 23 with respect to the stator set 21 is substantially equal to that of the rotating shaft 23 with respect to the rotor set 23. If the frictional force between the stator set 21 and the rotating shaft 23 is less than that between the rotor set 22 and the rotating shaft 23, the relative speed of the rotating shaft 23 with respect to the stator set 21 exceeds that of the rotating shaft 23 with respect to the rotor set 22. If the frictional force between the stator set 21 and the rotating shaft 23 exceeds that between the rotor set 22 and the rotating shaft 23, the relative speed of the rotating shaft 23 with respect to the stator set 21 is less than that of the rotating shaft 23 with respect to the rotor set 22. Note that the relative speed of the rotating shaft 23 with respect to the stator set 21 and the rotor set 22 is always less than the relative speed of the rotor set 22 with respect to the stator set 21 irrespective of conditions.

Figure 1:
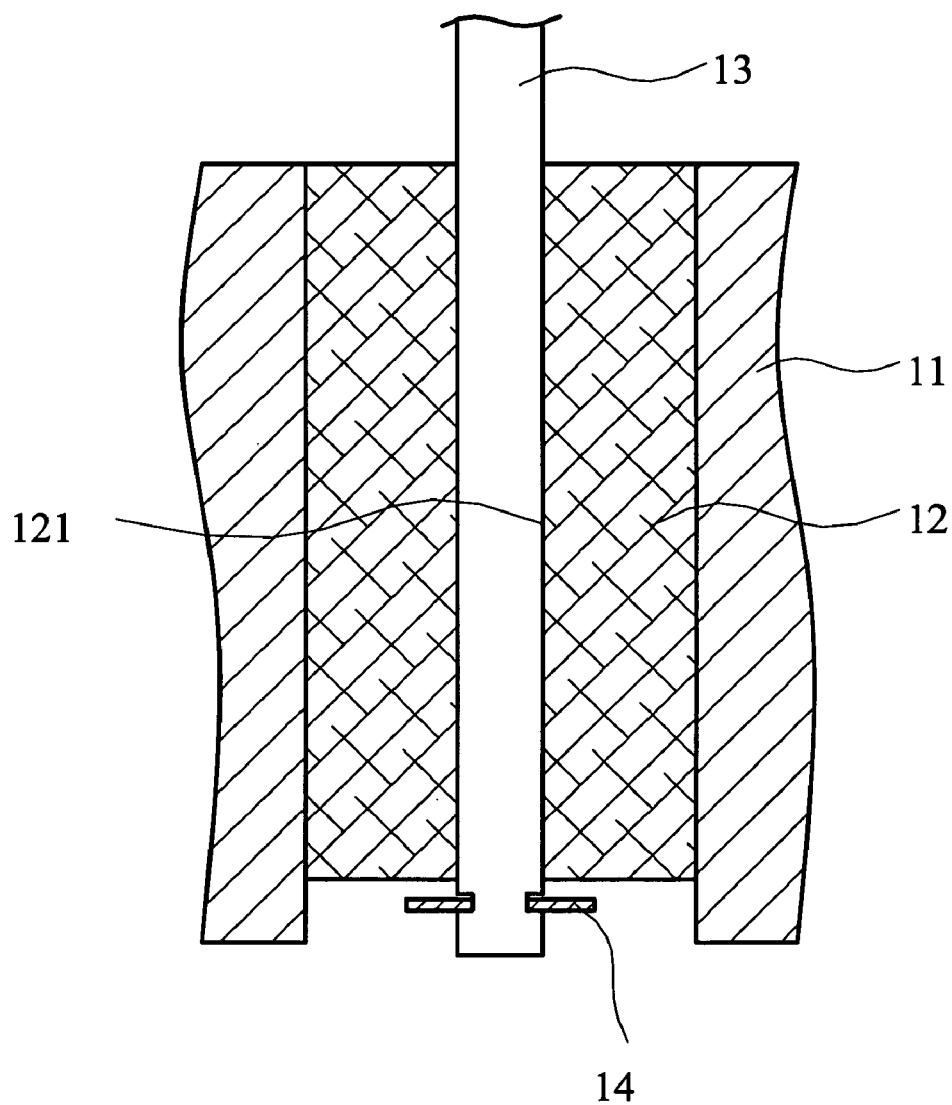
FIG. 1 is a schematic view of a conventional rotating structure.

The following description is a comparison between the conventional rotating structure 1 in FIG. 1 and the low-abrasion rotating structure 2 in FIG. 2. If the relative speed of the conventional stator with respect to the rotor is 10000 turns per second, the stator sleeve 12 in the conventional rotating structure 1 is subjected to abrasion from the rotating shaft 13 rotating in 10000 turns per second. On the contrary, in the low-abrasion rotating structure 2 of an embodiment of the invention, if the frictional force between the stator set 21 and the rotating shaft 23 is equal to that between the rotor set 22 and the rotating shaft 23, the relative speed of the rotating shaft 23 with respect to the rotor set 22 is only 5000 turns per second and the relative speed of the rotating shaft 21 with respect to the stator set 21 is only 5000 turns per second although the relative speed of the rotor set 22 with respect to the stator set 21 is still 10000 turns per second. Thus, only the stator sleeve 21 and the rotor sleeve 22 are subjected to abrasion from the rotating shaft 23 rotating in 5000 turns per second. As a result, the abrasion of the stator sleeve 212 and the rotor sleeve 222 can be largely reduced so as to prolong the life of the low-abrasion rotating structure 2. Also, since the relative speed of the rotating shaft with respect to each of the stator set and the rotor set is reduced, the noise generated by the rotation of the rotating structure of the embodiment of the invention can be effectively reduced.

Additionally, in the low-abrasion rotating structure of the embodiment of the invention, a larger gap d is formed between the stator set and the rotor set so that larger amounts of lubricant can be maintained in the gap d to increase lubricity. Also, since the spiral direction $R_2$ of the spiral coil is the same as the rotating direction $R_1$ of the rotor set, the lubricant flows into the concave portion of the stator set along the spiral direction of the spiral coil during rotation, thus preventing the lubricant from leaking.

The low-abrasion rotating structure of the embodiment of the invention can be applied to a motor. For example, the stator set 21 in FIG. 2 can be connected to a base of the motor, and the rotor set 22 in FIG. 2 can be connected to an output, such as blades of a fan, of the motor. A power generation device of the motor, such as a combination of a pair of silicon steel sheets and an electromagnet, can be disposed between an outer wall of the stator set 21 and an extension end of the rotor set 22 to generate the relative speed of the rotor set 22 with respect to the stator set 21. According to the structure of the embodiment, the motor may be quieter during operation. Also, the life of the motor can be prolonged due to low abrasion. As a result, the motor with the rotating structure of the embodiment of the invention can thus be applied to a wide range of environments and functions.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A low-abrasion rotating structure comprising:
    a rotor set comprising a rotor hole;
    a stator set comprising:
    a first stator assembly comprising:
    a first stator seat comprising a concave portion;
    a first stator sleeve disposed in the concave portion of the first stator seat in a close fit manner, wherein a stator hole is formed at a center of the first stator sleeve;
    a second stator assembly comprising:
    a second stator seat comprising a concave portion;
    a second stator sleeve disposed in the concave portion of the second stator seat in a close fit manner, wherein the stator hole is formed at a center of the second stator sleeve; and
    a rotating shaft rotatably disposed in the rotor hole and the stator hole such that the rotating shaft is rotatable relative to the stator set and the rotor set, wherein the rotor set is disposed between the first stator assembly and the second stator assembly, and the rotating shaft is encapsulated by the rotor set and the stator set.

2. The low-abrasion rotating structure as claimed in claim 1, wherein the rotor set comprises:
    a rotor seat comprising a concave portion; and
    a rotor sleeve disposed in the concave portion of the rotor seat in a close fit manner, wherein the rotor hole is formed at a center of the rotor sleeve.

3. The low-abrasion rotating structure as claimed in claim 2, wherein the rotor sleeve comprises oil-bearing material or ceramic material.

4. The low-abrasion rotating structure as claimed in claim 1, wherein the stator set comprises:
    a stator seat comprising a concave portion; and
    a stator sleeve disposed in the concave portion of the stator seat in a close fit manner, wherein the stator hole is formed at a center of the stator sleeve.

5. The low-abrasion rotating structure as claimed in claim 4, wherein the stator sleeve comprises oil-bearing material or ceramic material.

6. The low-abrasion rotating structure as claimed in claim 1, further comprising at least one fastener at an end of the rotating shaft to prevent the rotating shaft from separating from the rotor hole or the stator hole.

7. The low-abrasion rotating structure as claimed in claim 6, wherein the fastener is fixed at a bottom of the concave portion of the stator seat.

8. The low-abrasion rotating structure as claimed in claim 6, wherein the fastener is fixed at a bottom of the concave portion of the rotor seat.

9. The low-abrasion rotating structure as claimed in claim 1, wherein the rotating shaft comprises two ends with cambered surfaces.

10. The low-abrasion rotating structure as claimed in claim 9, further comprising at least one anti-wearing plate, disposed in the concave portion of the rotor set or the stator set, abutting the ends of the rotating shaft.

11. The low-abrasion rotating structure as claimed in claim 1, further comprising a spiral coil disposed between the rotor set and the stator set, wherein a spiral direction of the spiral coil is the same as a rotating direction of the rotating shaft.

12. The low-abrasion rotating structure as claimed in claim 1, wherein the first stator sleeve comprises oil-bearing material or ceramic material.

13. The low-abrasion rotating structure as claimed in claim 1, wherein the second stator sleeve comprises oil-bearing material or ceramic material.

14. The low-abrasion rotating structure as claimed in claim 1, wherein the low-abrasion rotating structure is applied to a motor.

* * * * *